(12) United States Patent
Di Maio et al.

(10) Patent No.: US 12,447,655 B2
(45) Date of Patent: Oct. 21, 2025

(54) PROCESS FOR MAKING PRODUCTS OF MULTI-GRADIENT FOAMED POLYMERIC MATERIAL

(71) Applicant: MATERIAS S.r.l., Naples (IT)

(72) Inventors: Ernesto Di Maio, Naples (IT); Luigi Nicolais, Ercolano (IT); Fabrizio Errichiello, Naples (IT)

(73) Assignee: MATERIAS S.r.l., Naples (IT)

( * ) Notice: Subject to any disclaimer, the term of this patent is extended or adjusted under 35 U.S.C. 154(b) by 342 days.

(21) Appl. No.: 17/769,100

(22) PCT Filed: Sep. 29, 2020

(86) PCT No.: PCT/IB2020/059090
§ 371 (c)(1),
(2) Date: Apr. 14, 2022

(87) PCT Pub. No.: WO2021/074729
PCT Pub. Date: Apr. 22, 2021

(65) Prior Publication Data
US 2023/0271358 A1    Aug. 31, 2023

(30) Foreign Application Priority Data
Oct. 18, 2019   (IT) .................. 102019000019310

(51) Int. Cl.
*B29C 44/60* (2006.01)
*B29C 44/12* (2006.01)
*B29C 44/34* (2006.01)

(52) U.S. Cl.
CPC ........ *B29C 44/348* (2013.01); *B29C 44/1285* (2013.01); *B29C 44/3453* (2013.01); *B29C 44/352* (2013.01); *B29C 44/60* (2013.01)

(58) Field of Classification Search
CPC .............. B29C 44/348; B29C 44/1285; B29C 44/3453; B29C 44/352; B29C 44/60;
(Continued)

(56) References Cited

U.S. PATENT DOCUMENTS 4,120,923 A * 10/1978 Kloker ................... B29C 44/06
521/917
4,473,665 A *  9/1984 Martini-Vvedensky ....................
B29C 44/505
264/DIG. 83

(Continued)

FOREIGN PATENT DOCUMENTS

CN      108491651 A  *  9/2018
JP        5-93085 A      4/1993
(Continued)

OTHER PUBLICATIONS

CN108491651 Translation (Year: 2024).*
(Continued)

*Primary Examiner* — Jacob T Minskey
*Assistant Examiner* — Adrien J Bernard
(74) *Attorney, Agent, or Firm* — Oblon, McClelland, Maier & Neustadt, L.L.P.

(57) ABSTRACT

A process for manufacturing products made of foamed polymeric material, comprising the following steps: generating, via software, a virtual model (M) of a product to be manufactured in a solid foamable polymeric material; performing a topological optimization via software of the virtual model (M) in order to obtain an optimized virtual model (MO) with areas of differentiated relative density; preparing the foamable polymeric material and inserting it in a mold (1); solubilizing, under pressure, at least one foaming agent in the foamable polymeric material placed in the mold (1) with a pressure profile of the foaming agent variable over time and/or space as a function of the topological optimi-
(Continued)

zation; releasing the pressure in order to obtain a product (S) made of foamed polymeric material provided with the above-mentioned areas of differentiated relative density; removing the product (S) made of foamed polymeric material from the mold (1).

18 Claims, 7 Drawing Sheets

(58) Field of Classification Search
CPC ... B29C 44/605; B29C 44/04; B29C 44/0461; B29C 44/3461; B29C 44/3446
See application file for complete search history.

(56) References Cited

U.S. PATENT DOCUMENTS

| 2012/0237734 A1 | 9/2012 | Maurer et al. |
| 2014/0259801 A1 | 9/2014 | Grondin |
| 2014/0377523 A1 | 12/2014 | Waggoner |
| 2014/0377530 A1 | 12/2014 | Waggoner |
| 2015/0351493 A1 | 12/2015 | Ashcroft et al. |
| 2016/0227877 A1 | 8/2016 | Grondin |
| 2016/0229463 A1 | 8/2016 | Feng et al. |
| 2019/0261736 A1 | 8/2019 | Grondin |
| 2019/0292345 A1 | 9/2019 | Klein et al. |
| 2020/0325299 A1 | 10/2020 | Waggoner |

FOREIGN PATENT DOCUMENTS

| WO | WO 2006/053132 A2 | 5/2006 |
| WO | WO 2011/066051 A1 | 6/2011 |
| WO | WO 2014/205180 A2 | 12/2014 |
| WO | WO 2015/054836 A1 | 4/2015 |
| WO | WO 2018/104009 A1 | 6/2018 |

OTHER PUBLICATIONS

CN108491651 PE2E (Year: 2024).*
International Search Report and Written Opinion issued Nov. 4, 2020 in PCT/IB2020/059090 filed on Sep. 29, 2020, 15 pages.

* cited by examiner

PROCESS FOR MAKING PRODUCTS OF MULTI-GRADIENT FOAMED POLYMERIC MATERIAL

FIELD OF THE INVENTION

The present invention regards a process for making products of multi-gradient foamed polymeric material, i.e. with areas differentiated in terms of density and/or pore size distribution (morphology) of the material. In particular, the process allows making optimized products (optimized regarding structure and/or function, e.g. rigidity, strength, resilience, impact absorption performances, thermal insulation performances, acoustic absorption performances), allowing the distribution of the material only where strictly required by the product. For such purpose, a topological optimization software is used together with a procedure for producing the foamed polymeric material capable of making multi-gradients of density and/or morphology. Such procedure provides for the solubilization of the physical foaming agents, necessary for foaming said material, characterized by variable conditions over time and/or space and function of the previously-performed topological optimization. More particularly, the variable conditions over time and/or space of the solubilization step generate, in the polymer, non-uniform profiles of the concentrations of the physical foaming agents which, at the time of expansion, generate non-uniform densities and morphologies in the product corresponding to those defined with the topological optimization.

STATE OF THE ART

Recently, an interest has developed towards the foamed materials "with gradient", whose structural and functional properties are improved with respect to these foamed materials characterized by uniform structures in terms of cell densities and/or morphologies. This has been demonstrated through recent scientific studies, both theoretical-numerical and experimental. The scientific literature describes processes for making such foamed structures stratified or with a gradient of morphology and/or density and methods for the obtainment of the same. For example, Zhou C. et al., in "Fabrication of functionally graded porous polymer via supercritical $CO_2$ foaming", Composites: Part B 42 (2011) 318-325, considers the use of "non-equilibrium profiles of the concentration of the foaming agent". In this method, the material to be foamed has been partially saturated by the foaming agent, through a solubilization step, which occurs at pressure and temperature that are constant over time, shorter than that necessary for reaching a uniform concentration of the foaming agent. In this case, the more remote portions (with respect to the free surfaces in contact with the foaming agent under pressure, hence the more internal portions) of the samples to be foamed contain a smaller concentration of the foaming agent than the portions adjacent to said surfaces (more external portions), in which the concentration of foaming agent readily reaches the conditions of equilibrium with the external pressure of the foaming agent. Consequently, the internal portion of the sample will be less foamed or non-foamed, while the external portions will be completely foamed. The design of structures of such type assumes the knowledge of the diffusion coefficient of the foaming agent in the polymer, available for a large number of polymer/foaming agent systems. Even if the described method is simple to achieve, it is rather limited, since it only allows making foamed materials with single gradient, characterized by less-foamed layers within the sample and more foamed layers externally.

M. Trofa, E. Di Maio, P. L. Maffettone, in "Multi-graded foams upon time-dependent exposition to blowing agent", Chemical Engineering Journal 362 (2019) 812-817, illustrate the possibility of generating stratified polymeric foams, with gradient, by using a foaming technology that provides for solubilizing under pressure one or more foaming agents in the foamable polymeric material with a pressure profile of said one or more foaming agents that is variable over time, i.e. through the introduction of variable conditions over time of the step of gas absorption in the foamable polymeric material.

Topological optimization software is also presently known. Such software was attained in the scope of computer-aided production engineering (CAE) and underwent a strong development in the scope of additive manufacturing. Additive manufacturing is a process of joining materials via manufacturing of objects from computerized 3D models. For example, the dissertation "Strutture leggere: ottimizzazione topologica e stampa 3D" ["Lightweight structures: topology optimization and 3D printing"] by N. Manfredi, Università Degli Studi di Pavia, Facoltà di Ingegneria, Corso di Laurea Magistrale in Ingegneria Civile, anno accademico 2014-2015 [University of Pavia, Faculty of Engineering, Civil Engineering graduate program, academic year 2014-2015] illustrates codes for the topological optimization of structures made of lattice material and the manufacturing of such structures optimized by means of 3D printing. In such thesis, it is explicitly stated that—unlike the lattice material—the foams are not suitable for the optimization process since they are characterized by strong stochasticity in the distribution, size and shape of the cells.

It is also known today that it is possible to obtain performance requirements of a component by employing a stratification of different materials with, for example, different rigidity. On the other hand, the use of different materials makes it very difficult (if not impossible) to recycle the component.

Definitions

The expression "polymeric material" indicates a polymeric material comprising a homo-polymer or a co-polymer, thermoplastic or thermosetting.

The expression "foamable polymeric material" indicates a polymeric material capable of absorbing a foaming agent at a certain temperature and under pressure, of allowing the nucleation of the bubbles upon release of the pressure itself and of resisting the elongational stresses during the growth of the bubbles, up to solidification.

The expression "foaming agent" indicates a substance capable of causing the expansion of the polymeric material by means of the formation of bubbles within the polymeric material.

The term "density" indicates the ratio between the weight of a given volume of the polymeric material and such volume.

The term "morphology" indicates the shape, the size and the numerousness per unit of volume of the bubbles (density of the bubbles) formed within the foamed polymeric material, as well as the local distribution of polymer between the walls and the pillars of the bubbles.

The term "foamed polymeric material" indicates a polymeric material at whose interior bubbles have been formed by means of a foaming agent.

Therefore, the density of a foamed polymeric material also depends on the morphology of the bubbles formed within said foamed polymeric material as well as on the numerousness of the same.

In the scope of the present description and of the enclosed claims, by "relative density" it is intended the ratio between the density of a given volume of the foamed polymeric material and the density of the same volume of the same solid polymeric material, i.e. not foamed, in which there are no bubbles.

The term "topological optimization" defines the study, carried out by means of software, capable of redefining the distribution of the masses within a component, on millimetric or micrometric scale, maintaining unaltered the macroscopic geometry, thus allowing the lightening of the component, i.e. increasing the specific performances thereof. The topological optimization allows exploiting, in an organic manner, the set of the masses used which synergistically collaborate with the component performances.

Through this method, it is possible to maintain the external shape of the components, respecting the producibility constraints, reducing the weights at play and ensuring the initial mechanical performances. The topological optimization investigates the optimal distribution of the material in a constrained design space.

In the scope of the present description and of the enclosed claims, by "topological optimization of a foamed polymeric material" it is intended the calculation via-software capable of redefining the distribution of mass of a structure in said foamed polymeric material, so as to lighten it. The topological optimization of a structure of foamed polymeric material allows defining the density gradients (i.e. shape, size and numerousness per unit of volume of the bubbles) of said foamed material, in order to obtain high-performing, sustainable and light structures. The design step provides for the design of the volume of the structure, the definition of the stresses, of the properties of the foamable polymeric material (solid, not yet porous) and the constraint conditions. Subsequently, the topological optimization is started, in order to obtain the virtual structure with the same shape and volume but with differentiated morphologies and densities, i.e. with morphology and density gradients of the foamed polymeric material.

With the term "virtual" referred to a structure, it is intended a computer-simulated structure.

SUMMARY OF THE INVENTION

The Applicant has felt the need to make products of polymer foams that are more complex, higher-performing, more sustainable and lighter than those obtainable with the methods of the prior art.

In particular, the Applicant has set as objective that of proposing a process for making polymer foam products provided with the abovementioned properties, which is fast and relatively inexpensive.

The Applicant has also set as objective that of producing polymer foam products that are very different from each other and belonging to different fields, diversified by using a same principle.

The Applicant has therefore set as objective that of proposing a process for producing polymer foam products which is flexible and optimizes the use of the material.

The Applicant has found that the above-listed objects and still others can be substantially achieved by combining the use of topological optimization software with a particular technology in order to attain multi-gradient polymer foams, in which the morphology and density gradients, together with the orientation of the pores, are designed by using said topological optimization software.

In particular, the Applicant has found that the above-listed objects and still others can be substantially achieved by a process according to one or more of the enclosed claims and/or according to one or more of the following aspects.

According to a first aspect, the present invention regards a process for manufacturing products of multi-gradient foamed polymeric material.

The process comprises the following steps:
  i. generating, via software, a virtual model of a product to be manufactured in a solid foamable polymeric material (i.e. not foamed);
  ii. assigning constraints and/or loads dictated by the use and performing a topological optimization via software of the virtual model in order to obtain an optimized virtual model with areas of differentiated relative density and/or differentiated morphology;
  iii. preparing said foamable polymeric material;
  iv. inserting said foamable polymeric material into a mold;
  v. solubilizing under pressure at least one foaming agent in the foamable polymeric material placed in the mold with a pressure profile of said at least one foaming agent variable over time and/or space as a function of the topological optimization;
  vi. releasing the pressure in order to obtain a product of foamed polymeric material with said areas of differentiated relative density and/or differentiated morphology; and
  vii. removing the product of foamed polymeric material from the mold.

In accordance with a second aspect, the present invention regards a product made of foamed polymeric material manufactured according to the process of the first aspect and/or according to one or more of the aspects listed hereinbelow.

By "solubilization under pressure of a foaming agent in the polymeric material" it is intended that the foaming agent, introduced under pressure in a mold that already contains the foamable polymeric material, penetrates into the polymeric material and saturates said polymeric material (i.e. the foamable polymeric material absorbs the foaming agent), so that, when the pressure of the foaming agent is released, bubbles are formed and grow within the polymeric material and the latter is foamed.

With "pressure profile of said at least one foaming agent variable over time and/or space" it is intended that the pressure of the foaming agent that is introduced in the mold and acts on the foamable polymeric material can be made to vary over time according to a predefined profile, e.g. a profile designed for the specific foamed product. In addition, the same pressure can assume variable values over space as a function of the surface portion of the foamable polymeric material. The pressure profile(s) of the foaming agent are calculated starting from the result of the previously-performed topological optimization and determine the shape, size and numerousness per unit of volume of the bubbles formed within the foamed polymeric material and hence the local density of said foamed polymeric material. The density of the foamed polymeric material can be defined during design phase area by area or even point by point.

The Applicant has verified that the process according to the invention allows manufacturing products made of foamed polymeric material provided with density gradients and/or morphology such to maximize the performances and minimize the weights. In other words, following the steps of solubilization and foaming, the foamed polymeric material has a relative average density lower than one, i.e. lower than that of the starting solid foamable polymeric material, and density gradients or morphology gradients (with relative density uniform and less than one) or both density and morphology gradients.

The Applicant has verified that the same result of the coupling of layers with different rigidity is obtained herein by using the same polymer in different densities and/or morphologies, ensuring recyclability since it is single-material.

The Applicant has also verified that the process according to the invention allows producing complex products provided with the abovementioned properties.

The Applicant has also verified that the process according to the invention allows producing such products in a relatively simple and quick manner.

The Applicant has also verified that the process according to the invention is applicable in fields that are very different from each other, such as furniture, nautical, automotive, clothing, building and still others.

Further aspects of the present invention are listed hereinbelow.

In one aspect, step i. (generating, via software, a virtual model of a product to be manufactured in a solid foamable polymeric material) is performed by means of a software computing program such as Autocad® by Autodesk® or 3D design by Ansys®.

In one aspect, step ii. (performing a topological optimization via software of the virtual model in order to obtain an optimized virtual model with areas of differentiated relative density) comprises: defining properties of the foamable polymeric material, stresses and conditions of constraint of the product to be manufactured; redefining the distribution of the masses of the product to be manufactured as a function of said properties of the foamable polymeric material, stresses and constraint conditions.

In one aspect, the virtual model of the product to be manufactured in the solid foamable polymeric material and the optimized virtual model with areas of differentiated relative density and/or areas with differentiated morphology have the same shape and occupy the same volume. The relative density of the virtual model of the product to be manufactured in the solid foamable polymeric material is equal to one everywhere. The optimized virtual model, with areas of differentiated relative density and possibly areas with differentiated morphology, has a relative density that is variable over space (density gradients). The relative density of the optimized virtual model with areas of differentiated relative density is less than one and optionally also equal to one, optionally the relative density is comprised between 0.01 and 1.

In one aspect, step iii. (preparing said foamable polymeric material) comprises: manufacturing a preform in said solid foamable polymeric material.

In one aspect, manufacturing the preform comprises: injection molding the preform or using other technologies such as compression molding, blowing, roto-molding, etc.

In one aspect, step iv. (inserting said foamable polymeric material into a mold) comprises: placing the preform in the mold, more precisely in an internal chamber of the mold.

In one aspect, the mold has the final shape of the product of foamed polymeric material.

In one aspect, the preform has a volume smaller than a volume of the product of foamed polymeric material.

In one aspect, the preform has a shape different from the final shape of the product of foamed polymeric material.

In one aspect, the preform has a shape similar to that obtained by the topological optimization and, in particular, relative to the areas with relative density equal to one.

In one aspect, the mold has at least one inlet and at least one outlet in fluid communication with the chamber for introducing or releasing said at least one foaming agent.

In one aspect, the mold is internally compartmented, i.e. the chamber of the mold has internal separators which divide the chamber into sub-chambers.

In one aspect, different foaming agents with the same pressure profile or with different pressure profiles or the same foaming agent with different pressure profiles is/are introduced into the different sub-chambers.

In one aspect, each sub-chamber is provided with a respective inlet and a respective outlet in order to introduce or release the foaming agent or the foaming agents.

In one aspect, at least before step v. (solubilizing under pressure at least one foaming agent in the foamable polymeric material placed in the mold with a pressure profile of said at least one foaming agent variable over time and/or space as a function of the topological optimization), the preform placed in the mold partially fills said mold, leaving empty volumes in order to allow the expansion of the foamable polymeric material during step vi. (releasing the pressure in order to obtain a product of foamed polymeric material with said areas of differentiated relative density). In other words, the preform, constituted by the solid polymer (i.e. not foamed) with which it is desired to attain the final product, only partially fills the final mold, leaving empty volumes. Only through the subsequent foaming step, such empty volumes are filled with the foam of the foamed polymer.

In one aspect, it is provided to virtually darken areas of the optimized virtual model provided with a relative density less than one and leave clearly visible only areas with relative density equal to one; in which the manufactured preform comprises the areas left visible with relative density equal to one and additional material distributed so as to generate, once foamed, the areas of differentiated relative density less than one.

In one aspect, it is provided to generate, via software, a virtual model of the preform starting from the optimized virtual model and to manufacture the preform, in said solid foamable polymeric material, starting from said virtual model of the preform.

In one aspect, the virtual model of the preform is obtained starting from the optimized virtual model by virtually removing, step by step, volumes at lower density from said optimized virtual model until the mass of the virtual model of the preform obtained (in solid polymer, i.e. not foamed) is equal to the mass of the optimized virtual model, i.e. the volume of the virtual model of the preform is equal to the volume actually occupied (without the bubbles, as if it had not foamed) by the polymeric material of the optimized model.

In one aspect, the virtual model of the preform is generated by virtually compressing areas of the optimized virtual model provided with a relative density less than one up to bringing said areas a relative density equal to one.

In one aspect, the virtual model of the preform has a volume smaller than a volume of the optimized virtual model and a mass equal to a mass of the optimized virtual model.

In one aspect, said foamable polymeric material is chosen from the group consisting of thermoplastic or thermosetting polymeric materials.

In one aspect, said thermoplastic polymeric material is chosen from the group which comprises polyolefins, polyurethanes, polyesters.

In one aspect, said thermosetting polymeric material is chosen from the group which comprises polyurethanes, polyester resins, epoxy resins, cyanoacrylic resins, polyphenol, vinyl esters, melamines, polydicyclopentadiene and polyimides.

In one aspect, step v. (solubilizing under pressure at least one foaming agent in the foamable polymeric material placed in the mold with a pressure profile of said at least one foaming agent variable over time and/or space as a function of the topological optimization) is performed in accordance with that illustrated in the publication M. Trofa, E. Di Maio, P. L. Maffettone, in "Multi-graded foams upon time-dependent exposition to blowing agent", Chemical Engineering Journal 362 (2019) 812-817, i.e. according to a method which comprises at least one step of non-equilibrium in the mass transport of a foaming agent in a polymer using at least one condition of variability over time of the solubilization step preceding the expansion.

In one aspect, step v. comprises: solubilizing under pressure a plurality of foaming agents in the foamable polymeric material placed in the mold.

In one aspect, step v. comprises: solubilizing said foaming agents in succession one after the other.

In one aspect, said at least one foaming agent comprises a mixture of two or more foaming agents.

In one aspect, said at least one foaming agent is a gas.

In one aspect, said at least one foaming agent is chosen from the group consisting of inert gases and substituted or unsubstituted aliphatic hydrocarbons (linear, branched or cyclic) and having 3 to 8 carbon atoms.

In one aspect, said at least one foaming agent is chosen from the group consisting of nitrogen, carbon dioxide, n-butane, iso-butane, n-pentane, iso-pentane, 1,1,1,2-tetrafluoroethane (Freon R-134a), 1,1-difluoroethane (Freon R-152a), difluoromethane (Freon R-32), and pentafluoroethane, sulfur hexafluoride.

In one aspect, said pressure profile varies over time periodically or non-periodically. Through a pressurization program with partial pressures of different foaming agents, different concentrations of foaming agents are solubilized in the polymer constituting the preform.

In one aspect, said pressure profile varies from a minimum pressure equal to the atmospheric pressure to a maximum of 300 bar, optionally from the atmospheric pressure to 250 bar, optionally from the atmospheric pressure to 200 bar.

In one aspect, step vi. of releasing the pressure is carried out instantaneously, i.e. with a speed of reduction of the pressure from 0.1 MPa/s to 1000 MPa/s, optionally from 1 MPa/s to 10 MPa/s.

In one aspect, a thermal profile is set to the polymeric material during step iv. and/or v. and/or step vi. in order to optimize the different steps.

In other words, first, during the step of solubilization and immediately before the release of pressure, the temperature of the system is controlled in order to optimize the different steps.

In one aspect, a thermal profile can be set in concert with the solubilization step, in order to make complex multi-gradient systems for the pores.

In one aspect, step v. of solubilization is actuated to a temperature higher than 20° C.

In one aspect, it is provided to heat the mold, and hence the polymeric material, during step(s) iv. (inserting) and/or v. (solubilizing) and/or vi. (releasing).

In one aspect, the mold is heated according to a thermal profile, optionally variable over time and/or space.

In one aspect, the mold is heated to a temperature comprised between 50° C. and 350° C., optionally up to 250° C.

In one aspect, it is provided to cool the mold, and hence the polymeric material, after step vi. (releasing) and before step vii. (removing). This allows solidifying the foam and stabilizing the multi-gradient foamed structure attained.

In one aspect, it is provided to cool the mold before step vi. (releasing) so as to pass from the solubilization temperature to the solidification/release temperature of the foaming agent. In one aspect, the mold is cooled up to a temperature comprised between 5° C. and 150° C., optionally to 100° C.

In one aspect, step v. (solubilizing) is actuated for a solubilization time on the order of minutes or tens of minutes.

In one aspect, it is provided to partially fill the empty volumes of the mold with incoherent material, optionally in granules or balls, in a foamable polymeric material.

In one aspect, the incoherent material is the same foamable polymeric material as the preform or a different material.

In one aspect, the incoherent material differs from that of the preform by degree of crystallinity and/or structural order.

In one aspect, it is provided to choose the incoherent material and its quantity so as to locally limit or prevent the solubilization of the foaming agent in the foamable polymeric material. Said incoherent material therefore carries out a double function: reducing the time of step v. of solubilization and contributing to making complex multi-gradient density products.

In one aspect, the partial filling of the empty volumes is performed after step iv. (inserting said foamable polymeric material in the mold).

In one aspect, the balls or the granules of the incoherent material have size on the order of a millimeter, optionally the balls have a diameter comprised between 0.01 mm and 3 mm.

In addition to partial filling of the mold with the preform, if necessary, the inclusion of the incoherent material of the polymer, in order to fill the mold in more remote areas, allows reducing the time of step v. of solubilization. The reduced dimensions of the balls/granules allow maintaining the process times low. With this expedient, the step of solubilization can be reduced to times on order to a minute.

In one aspect, it is provided to partially or totally mask one or more portions of the preform placed in the mold in order to locally limit or prevent the solubilization of said at least one foaming agent in the foamable polymeric material. This is an alteration instrument that contributes to making complex multi-gradient density products of the polymeric material.

In one aspect, masking partially or totally one or more portions of the preform comprises: applying a film on the portion(s) of the preform, in which said film is configured for preventing or limiting the passage of the foaming agent.

In one aspect, applying a film comprises: applying an aqueous solution of a polymer with barrier properties to the foaming agent on the portion(s) of the surface of the preform, allowing the water of the solution to evaporate or making it evaporate in order to obtain the film.

In one aspect the product of foamed polymeric material does not have density discontinuities. In other words, the product of foamed polymeric material has density gradients (even high gradients), i.e. the density is not constant, but has gradual variations and not discontinuities.

In one aspect, said product is an article/element that can belong to different fields and is an article/element that is separate/stand-alone or it can be part of a more complex assembly.

In one aspect, said product is, or is part of, a vehicle, a boat (e.g. the hull of a boat, an aircraft, a building structure, optionally for soundproofing, a garment or a clothing accessory, a medical device, an individual protection device (e.g. a helmet) or a collective protection device, a piece of furniture (for example a table), or a sports equipment piece.

Further features and advantages will be clearer from the detailed description of preferred but not exclusive embodiments of a process for manufacturing products of foamed polymeric material in accordance with the present invention.

DESCRIPTION OF THE DRAWINGS

Such description will be set forth hereinbelow with reference to the enclosed drawings, provided only as a non-limiting example in which.

DETAILED DESCRIPTION OF EMBODIMENTS OF THE INVENTION

Figure 1A:
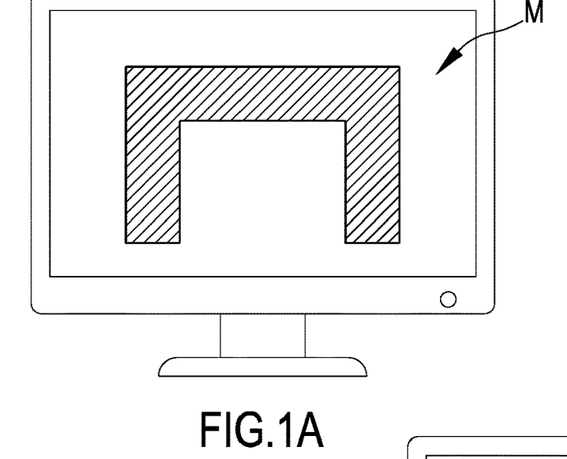
FIGS. 1A, 1B and 1C illustrate respective virtual steps in accordance with the process according to the present invention.
Figure 1B:
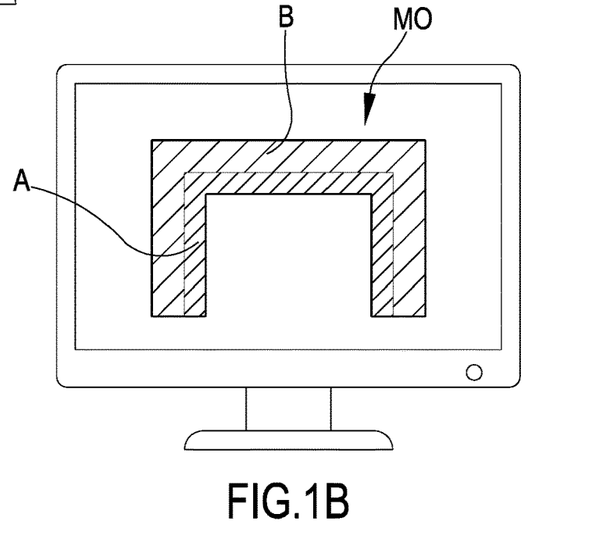
Figure 1C:
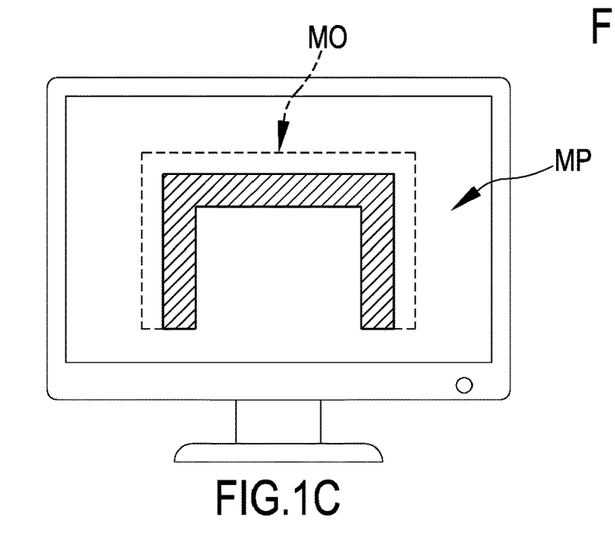
Figure 2A:
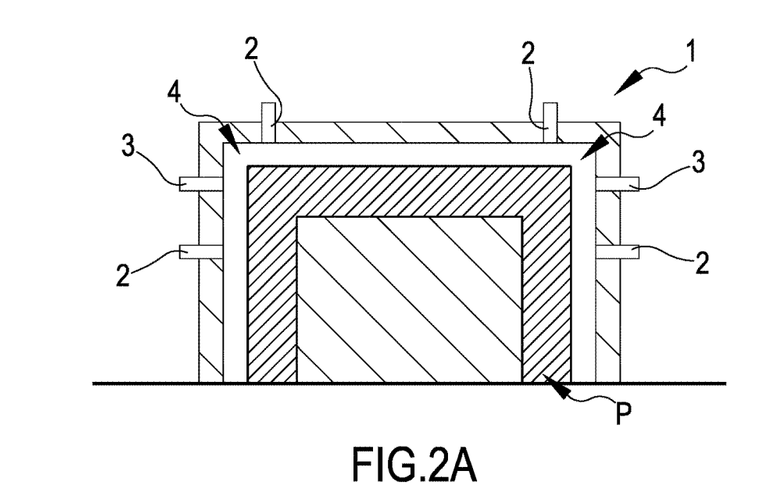
FIGS. 2A, 2B, 2C and 2D illustrate respective manufacturing steps in accordance with the process according to the present invention.
Figure 2B:
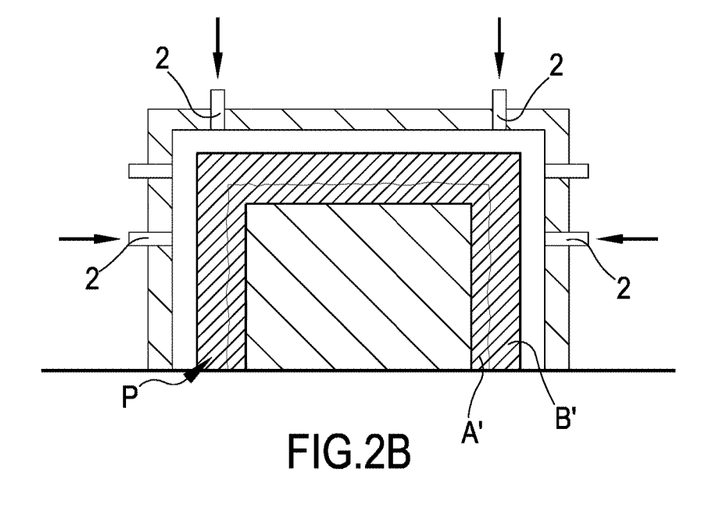
Figure 2C:
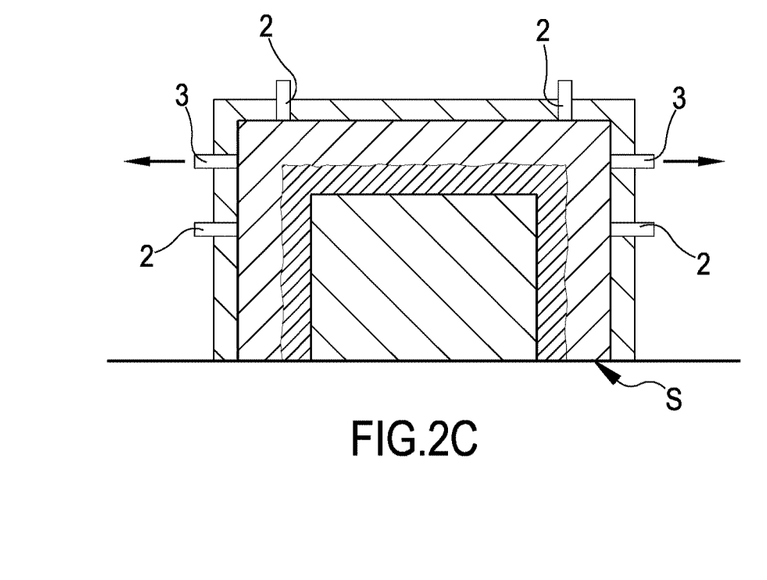
Figure 2D:
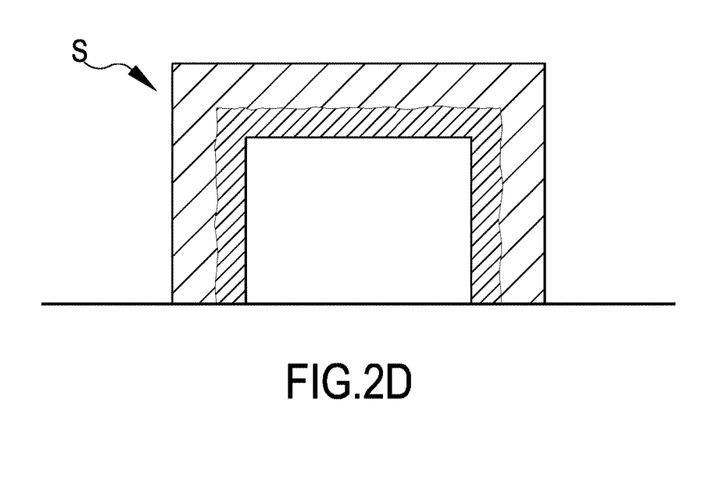
Figure 3:
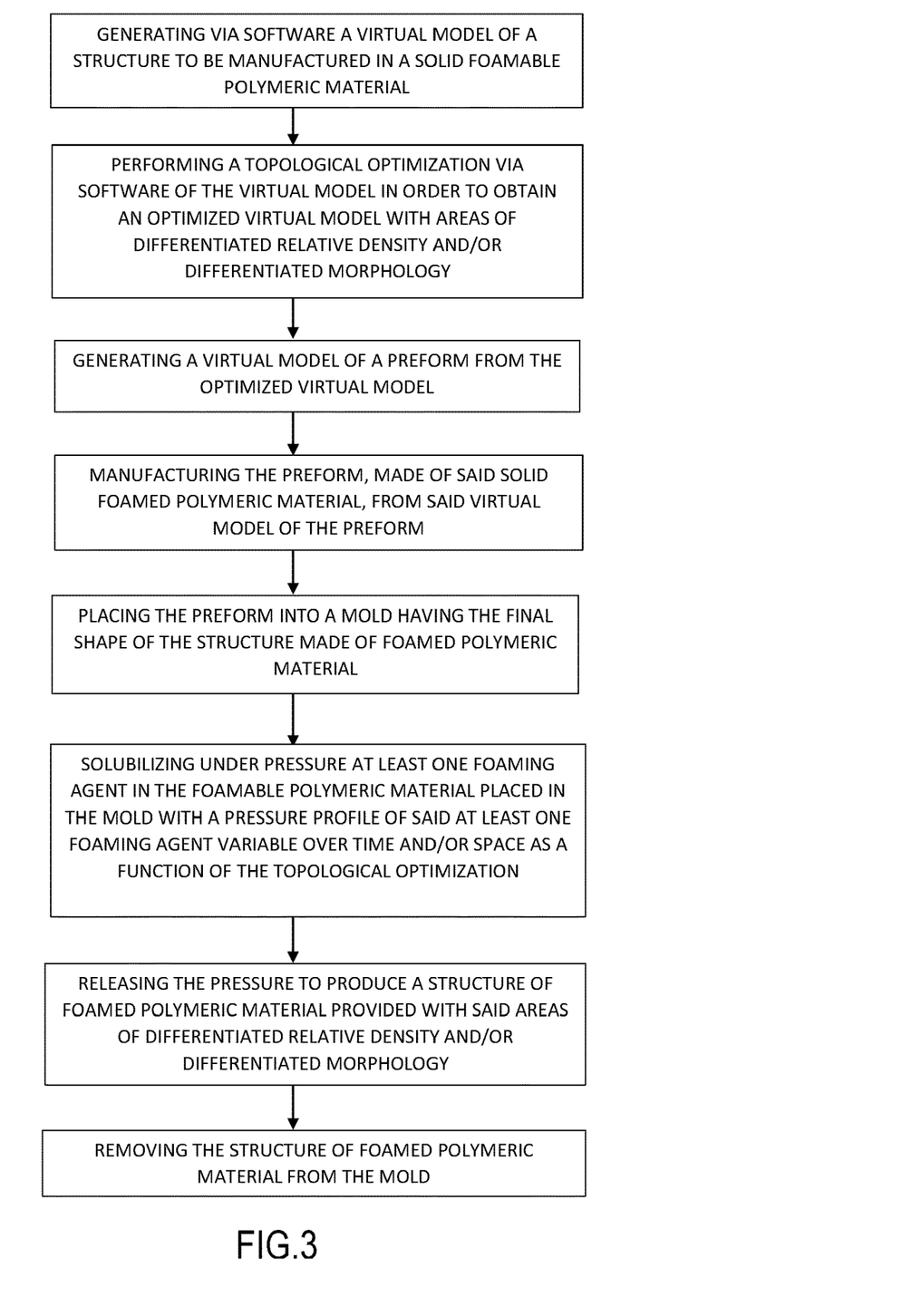
FIG. 3 is a flow diagram exemplifying the process according to the present invention.

FIGS. 1A, 1B, 1C, 2A, 2B, 2C, 2D and the flow diagram of FIG. 3 schematically illustrate an example of the process for manufacturing products of foamed polymeric material according to the present invention. In such example, the illustrated product is a kind of portal represented in two dimensions only for exemplifying purposes in order to explain the process and does not intend to represent a real product.

Through a software computing program (e.g. Autocad® by Autodesk®, or 3D design by Ansys®), a virtual model M of the product to be manufactured is first of all generated, for which also the foamable polymeric material used (FIG. 1A) is defined. For example, such foamable polymeric material is a thermoplastic polymeric material such as polystyrene or thermosetting such as polyurethanes, polyester resins, epoxy resins, cyanoacrylic resins, polyphenol, vinyl esters, melamines, polydicyclopentadiene and polyimides. The foamable polymeric material of the virtual model M is solid (it is not porous, no bubbles are present), i.e. it is in a compact and non-foamed conformation.

By means of a topological optimization software program (for example Fusion 360 by Autodesk® or Ansys® Topology Optimization), which can also be the same used for generating the virtual model M or a different software, once the typical loads and constraints to which the foamed polymeric material product is subjected during its operating lifetime are defined, the mass distribution of the virtual model M is redefined, maintaining the same shape and the same volume as said virtual model M. The topological optimization software recalculates the density of the various parts of the virtual model M as a function of the typical loads and constraints such to, for example, maintain an overall rigidity of the product structure, preventing points of stress beyond the threshold of the material itself and to lighten such structure. The software usually allows inserting different optimization targets: for example maximizing the resistance to the load and/or reducing the mass up to a certain percentage. The topological optimization generates an optimized virtual model MO with areas of differentiated relative density. FIG. 1A illustrates the virtual model M in solid polystyrene with uniform density. FIG. 1B illustrates the optimized virtual model MO in which an area with greater density A and an area with lower density B are visible. As can be observed, the virtual model M of the product to be manufactured in the solid foamable polymeric material and the optimized virtual model MO with areas of differentiated relative density have the same shape and occupy the same volume. The relative density of the virtual model M of the product to be manufactured in the solid foamable polymeric material is everywhere equal to one. The relative density (given by the ratio between the density of a given volume of the foamed polymeric material and the density of the same volume of the same solid polymeric material, i.e. not foamed, in which there are no bubbles) of the area A of the optimized virtual model MO is for example equal to 0.9 and the relative density of the area B of the optimized virtual model MO is for example equal to 0.6. In FIG. 1B, the clear separation between the area A and the area B was illustrated only for the sake of clarity, but the process is aimed to avoid sudden variations of density.

At this point, the optimized virtual model MO is processed, always via-software, so as to virtually compress the areas A and B of the optimized virtual model MO, provided with a relative density lower than one, up to bringing said areas with relative density equal to one and obtain a virtual model of a preform MP which has a volume smaller than a volume of the optimized virtual model MO and a mass equal to a mass of the optimized virtual model (FIG. 1C). The virtual model of the preform MP can also have a shape different from that of the optimized virtual model MO.

An actual preform P constituted by the solid foamable polymeric material (in the described case, polystyrene that is not foamed) is attained, starting from the virtual model of the preform MP, for example by injection molding or other technologies.

Alternatively, the shape of the preform is calculated starting from the optimized virtual model, darkening areas provided with a relative density lower than one and leaving visible only the areas with relative density equal to one. Additional material with relative density equal to one is distributed on the abovementioned areas with relative density equal to one. The additional material is that which, once foamed, generates the areas with differentiated relative density lower than one of the final foamed polymeric material product.

According to a different alternative, the virtual model of the preform MP is obtained starting from the optimized virtual model MO by virtually removing, step by step, volumes at lower density from said optimized virtual model MO until the mass of the virtual model of the preform MP obtained (in solid polymer, i.e. not foamed) is equal to the mass of the optimized virtual model MO, i.e. the volume of the virtual model of the preform MP is equal to the volume actually occupied (without the bubbles, as if it was not foamed) by the polymeric material of the optimized model MP. The volume and the shape of the virtual model of the preform MP are derived from the optimized virtual model MO, maintaining the mass of polymeric material as constant.

The preform P is then housed in a chamber of a mold 1 which reproduces a reverse image of the final shape of the product of foamed polymeric material to be manufactured (FIG. 2A).

The mold 1 is structured in order to allow the injection, in its chamber, of a foaming agent, for example a gas (e.g. $N_2$), configured for saturating the foamable polymeric material of the preform P through one or more steps of solubilization under pressure. The mold 1 is therefore provided with inlets 2 connected to one or more pumps, e.g. volumetric, driven by an electronic control unit in order to control the pump(s) and actuate different programs of injection of the foaming agent and of management of the pressure of said foaming agent. The mold 1 is also provided with outlets 3 managed by means of valves connected to the control unit in order to allow the discharging of said foaming agent.

The chamber of the mold 1 has a volume greater than that of the preform P so that, as is visible in FIG. 2A, the preform P placed in the mold 1 only partially fills said mold, leaving empty volumes 4. In the schematic example illustrated in FIG. 2A, an empty volume 4 is delimited between an upper and lateral external surface of the preform P and a lower and lateral internal surface of the chamber of the mold 1.

The electronic control unit is programmed as a function of the previously performed topological optimization and drives the pumps so that they introduce the foaming agent in the mold 1 with one or more pressure profiles that are variable over time and/or space. The pressure of the foaming agent that is introduced in the mold 1 and acts on the foamable polymeric material of the preform P is made to vary over time according to a predefined profile. For example, the pressure profile is made to vary over time periodically or non-periodically. In addition, the pressure of the foaming agent can be adjusted so as to take on different values on different portions of a surface of the preform P. For such purpose, the mold 1 for example can be provided with internal separators which divide the chamber into sub-chambers, each provided for example with an inlet 2, in order to introduce a respective foaming agent with a respective pressure profile. For example, the pressure profile is made to vary from a minimum pressure equal to the atmospheric pressure to a maximum of 300 bar.

The foaming agent is solubilized in the foamable polymeric material of the preform P and different concentrations of the foaming agent are attained in different areas of the polymer constituting the preform P. In the schematic example illustrate in FIG. 2B, more internal areas of the preform P (A' at greater distance from the free surfaces) will have lower concentrations of foaming agent while more external areas of the preform P (B' at lower distance from the free surfaces) will have higher concentrations of foaming agent. It follows that, in the subsequent pressure release step, in which the opening of the valves on the outlets 3 allows the nearly instant depressurization of the chamber of the mold 1, the more external areas B' of the preform P will be foamed more than the more internal areas A', giving rise to a product of foamed polymeric material S with said areas of differentiated relative density corresponding to the optimized virtual model MO. As can be observed, the empty volumes 4 are filled by the foam of the foamed polymer during the pressure release step.

The pressure profile(s) of the foaming agent generated by the pump(s) under the control of the control unit are calculated starting from the result of the previously performed topological optimization and determine the shape, the size and the numerousness per unit of volume of the bubbles formed within the foamed polymeric material (morphology) and hence the local density of said foamed polymeric material. The foamed polymeric material has density gradients (even high) but not discontinuity.

The product of foamed polymeric material S can then be removed from the mold 1 (FIG. 2D). Such product of foamed polymeric material S mirrors the characteristics of the optimized virtual model MO. As can be observed, the preform P has a volume smaller than a volume of the product of foamed polymeric material S and a shape different from the final shape of said product of foamed polymeric material S. In variants of the process according to the present invention, the solubilization step is performed by using multiple foaming agents injected in succession in the chamber of the mold 1 or mixtures of foaming agents.

In variants of the process, the agent or the foaming agent(s) can be chosen from the group consisting of inert gases and substituted or unsubstituted aliphatic hydrocarbons (linear, branched or cyclic) and having 3 to 8 carbon atoms. For example, the foaming agent can be nitrogen, carbon dioxide, n-butane, iso-butane, n-pentane, iso-pentane, 1,1,1,2-tetrafluoroethane (Freon R-134a), 1,1-difluoroethane (Freon R-152a), difluoromethane (Freon R-32), pentafluoroethane, sulfur hexafluoride.

In variants of the process according to the present invention, after having placed the preform P in the chamber of the mold 1, it is provided to totally or partially fill the empty volumes 4 of the mold 1 with incoherent material, for example in granules or balls, of foamable polymeric material, for example of the same foamable polymeric material as the preform, in order to accelerate solubilization of the foaming agent. In this case, optionally, the foaming agent is solubilized both in the foamable polymeric material of the preform P and in the granules/balls of the compliant material also included in the mold. In this manner the solubilization step can be reduced by tens of minutes, to times on the order of a minute. Such balls can also be chosen (as material, number and size) so as to locally limit the solubilization of the foaming agent in the foamable polymeric material and hence obtain multi-gradient products that are even more complex.

In variants of the process according to the present invention, so as to make said complex products with multi-gradient density of the polymeric material, it is provided to partially or totally mask one or more portions of the preform P before this is placed in the mold 1. In this manner, once said preform P is placed in the mold 1, it is possible to locally limit or prevent the solubilization of the foaming agent in the foamable polymeric material. For such purpose, for example, an aqueous solution of a polymer can be applied (e.g. polyvinyl alcohol PVA) with barrier property against the foaming agent (e.g. $CO_2$) on the portion(s) of the surface of the preform P. With the evaporation of the water, one obtains a PVA film capable of locally conditioning the step of solubilizing the $CO_2$.

In variants of the process according to the present invention, first, during the step of solubilization and immediately before the release of pressure, the temperature of the system is controlled in order to optimize the different steps. For example, step v. of solubilization is actuated at a temperature higher than 20° C. Alternatively, a thermal profile that is variable over time and/or space can be set, in concert with the solubilization step, in order to attain complex multi-gradient systems with the density of the polymeric material. For example, the mold 1 is heated up to a temperature comprised between 50° C. and 350° C. Possibly, the mold 1 can also be cooled, for example to a temperature comprised between 5° C. and 150° C., after step vi. (releasing) and before step vii. (removing). This allows solidifying the foam and stabilizing the attained multi-gradient foamed structure.

In variants of the process, the control of the pressure and/or of the temperature and/or of the type of foaming agent allows manufacturing products with a relative average density lower than one, i.e. less than that of the starting solid foamable polymeric material, and density gradients or morphology gradients (but with relative density uniform and less than one) or both density and morphology gradients.

Figures 4A, 4B, 4C:
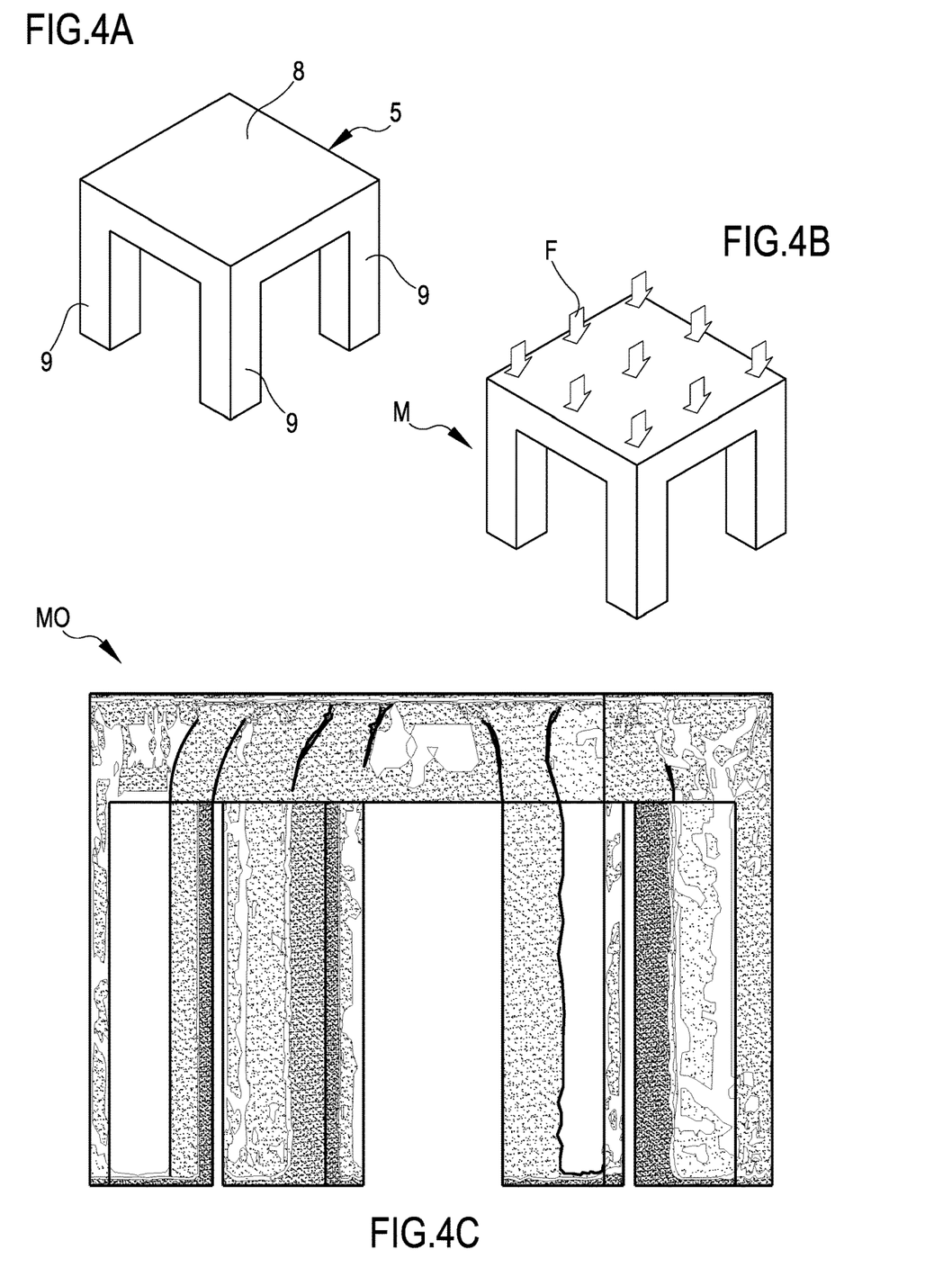
FIGS. 4A, 4B, 4C, 4D, 4E and 4F illustrate several steps in accordance with the process according to the present invention for manufacturing a table.

FIGS. 4A-4F illustrate a different example for making a stool 5 of polystyrene. FIG. 4A illustrates the stool to be made. FIG. 4B illustrates the virtual model M of the stool 5 with a load F applied that is vertically distributed on the seat of the stool 5. FIG. 4C illustrates the optimized virtual model MO in which the darker areas represent the portions with greater density and the lighter areas represent the portions with lower density.

Figure 4D:
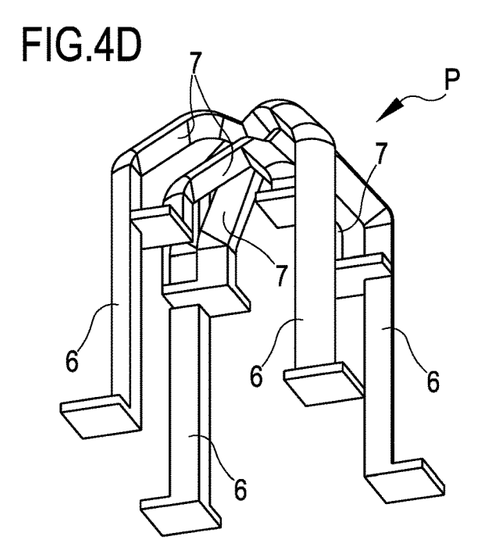

FIG. 4D illustrates the preform P of polystyrene, calculated as detailed above and made for by injection molding. As can be observed, the preform P has four longer legs 6 and four shorter arms 7. The four arms 7 together with upper parts of the four legs 6 are configured to form, after the solubilization and the foaming, the seat 8 of the stool. The lower parts of the four legs 6 are configured for forming the legs 9 of the stool 5.

Figure 4E:
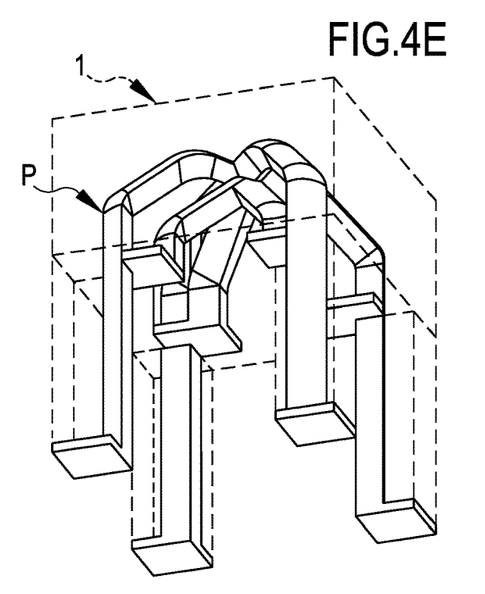

The preform P is inserted in the mold 1 with the final shape of the stool (FIG. 4E). The preform P partially fills the mold 1, leaving empty volumes. Only through the subsequent foaming step, such empty volumes are filled with the foam. Such empty volumes can be possibly filled with balls of polystyrene with a diameter of several millimeters, in order to keep the process times low.

The solubilization provides for a first pressurization with nitrogen $N_2$ (characterized by a lower solubility in the polystyrene) at 100 bar. Subsequently, a washing with carbon dioxide $CO_2$ (characterized by a greater solubility in the polystyrene) is actuated at 100 bar, substituting $N_2$ with $CO_2$. More internal areas of the preform P (at greater distance from the free surfaces) will have lower concentrations of foaming agent. The parts of the preform P exposed to the foaming agents will be, at the time of their subsequent foaming, characterized by a density profile increasing towards the interior, resulting less dense externally and denser internally. In the present case, the mold 1 is kept at 100° C. during all steps of the process.

Figure 4F:
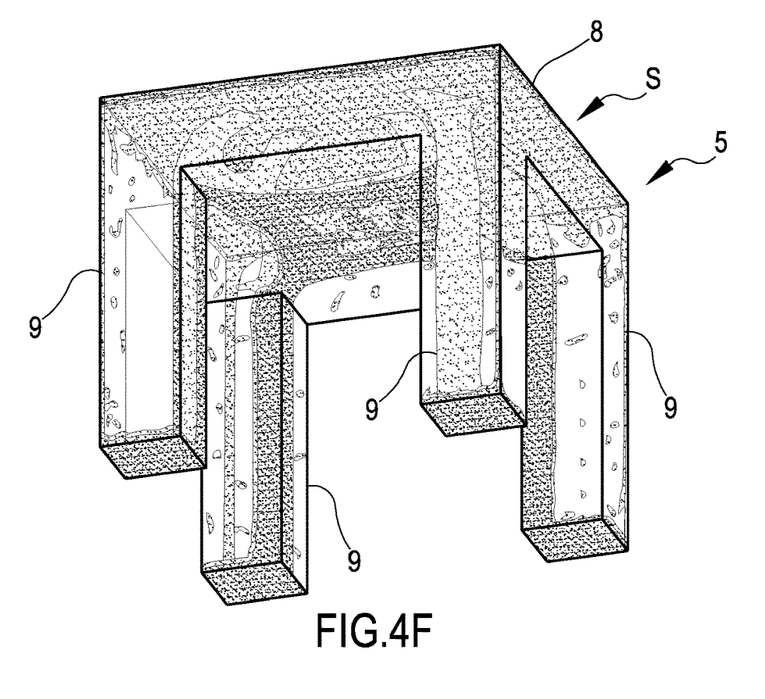

FIG. 4F illustrates the stool 5 obtained after the release of the pressure in the mold 1 and the foaming of the polystyrene. The darker areas of the figure represent portions with greater density and the lighter areas are the portions with lower density, in accordance with the optimized virtual model MO.

Figure 5A:
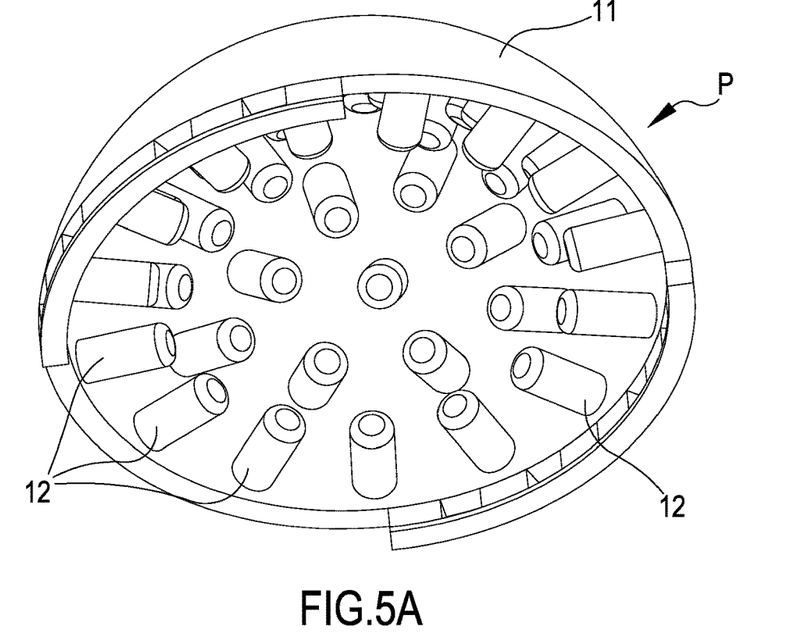
FIGS. 5A, 5B and 5C illustrate several steps in accordance with the process according to the present invention for manufacturing a cap of a helmet.
Figure 5B:
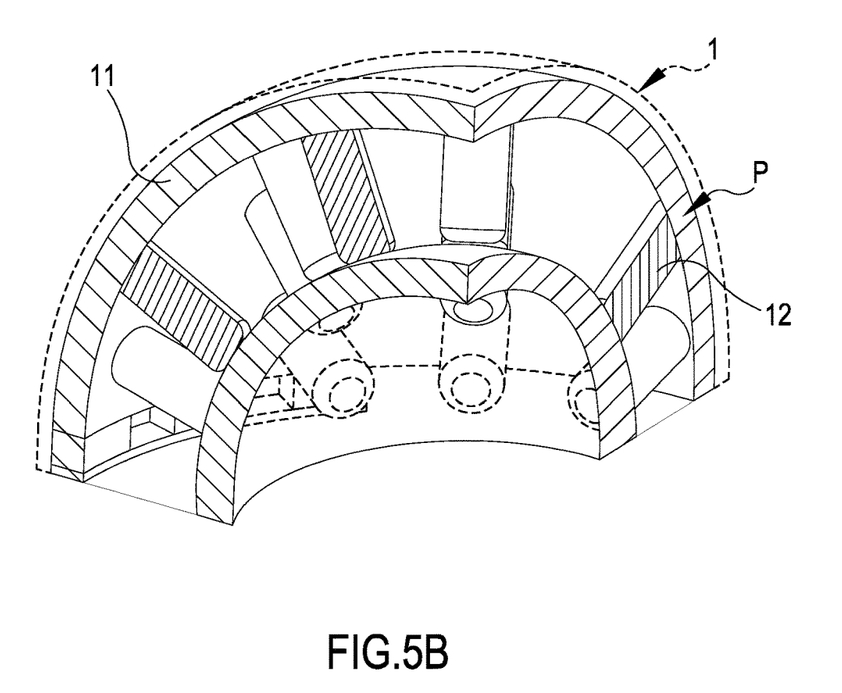
Figure 5C:
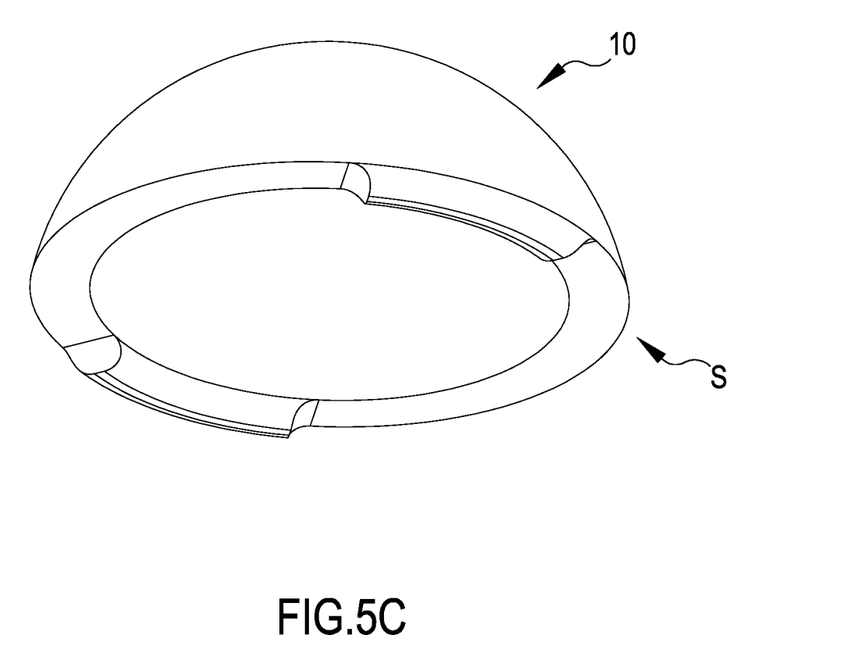
Figure 6:
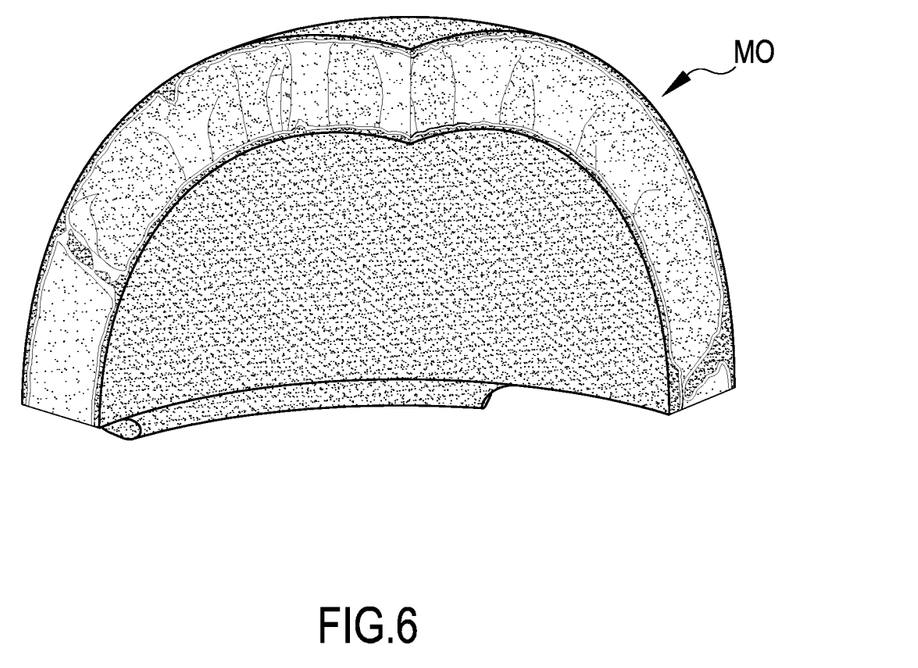
FIG. 6 illustrates a virtual image of the helmet cap, part of the process according to the present invention.

FIGS. 5A, 5B, 5C and 6 illustrate another example for making a cap 10 of a helmet of polystyrene. FIG. 5A illustrates the preform P, FIG. 5B illustrates the preform in the mold while FIG. 5C illustrates the final product of foamed polymeric material S. As can be observed, the preform P has a hemispherical external portion 11 and excrescences 12 which are radially extended towards the interior of the hemispherical external portion 11. Following the solubilization and the subsequent foaming, the excrescences 11 form an internal portion of the cap 10. FIG. 6 illustrates the optimized virtual model MO of the cap with areas of differentiated relative density in which the darker areas represent the portions with greater density and the lighter areas represent the portions with smaller density.

The products obtainable with the process according to the invention are multiple and relative to different fields. For example, the product is, or is part of, a vehicle, a boat, an aircraft, a building structure, optionally for soundproofing, a garment or a clothing accessory, a medical device, an individual protection device (e.g. the above-described helmet) or collective protection device, a piece of furniture (such as the above-described small table, or a piece of sports equipment.

The invention claimed is:

1. A process for manufacturing a product made of multi-gradient foamed polymeric material, comprising:
   (i) generating, via software, a virtual model of a product to be manufactured in a solid foamable polymeric material;
   (ii) assigning at least one of constraints and loads dictated by use and performing a topological optimization via software of the virtual model in order to obtain an optimized virtual model with areas of at least one of differentiated relative density and differentiated morphology, wherein the topological optimization redefines a distribution of masses within the virtual model, on millimetric or micrometric scale, while maintaining unaltered a macroscopic geometry;
   (iii) preparing said foamable polymeric material;
   (iv) inserting said foamable polymeric material into a mold;
   (v) solubilizing under pressure at least one foaming agent in the foamable polymeric material placed in the mold with a pressure profile of said at least one foaming agent variable over at least one of time and space as a function of the topological optimization;
   (vi) releasing the pressure to produce a product made of foamed polymeric material provided with said areas of at least one of differentiated relative density and differentiated morphology; and
   (vii) removing the product of foamed polymeric material from the mold.

2. The process according to claim 1, wherein step iii comprises: manufacturing a preform of said solid foamable polymeric material, wherein step iv comprises: placing the preform in the mold.

3. The process according to claim 2, wherein, at least before step v, the preform placed in the mold partially fills the mold, leaving empty volumes to allow expansion of the foamable polymeric material during step vi.

4. The process according to claim 2, comprising: generating, via software, a virtual model of the preform from the optimized virtual model and manufacturing the preform from the virtual model of the preform.

5. The process according to claim 4, wherein the virtual model of the preform is generated by virtually removing, step by step, volumes at lower density from said optimized virtual model until a mass of the virtual model of the preform obtained in solid polymer is equal to a mass of the optimized virtual model.

6. The process according to claim 2, wherein manufacturing the preform comprises: molding the preform through injection molding, compression molding, blowing molding, or roto-molding.

7. The process according to claim 3, comprising: partially filling the empty volumes of the mold with incoherent material, the incoherent material being the same foamable polymeric material as the preform or a different material.

8. The process according to claim 2, comprising: masking partially or totally portions of the preform placed in the mold to locally limit or prevent the solubilization of said at least one foaming agent in the foamable polymeric material.

9. The process according to claim 8, wherein the masking partially or totally portions of the preform comprises: applying a film to said portions of the preform.

10. The process according to claim 7, comprising: choosing the incoherent material and its quantity in such a way as to locally limit or prevent the solubilization of the foaming agent in the foamable polymeric material.

11. The process according to claim 1, comprising: heating the mold according to a thermal profile, during at least one of steps iv, v, and vi.

12. The process according to claim 1, wherein said pressure profile varies over time periodically or non-periodically.

13. The process according to claim 1, wherein the pressure profile varies from a minimum pressure equal to the atmospheric pressure to a maximum of 300 bar.

14. The process according to claim 1, wherein step v comprises solubilizing under pressure a plurality of foaming agents in the foamable polymeric material placed in the mold.

15. The process according to claim 1, wherein at least one foaming agent is chosen from the group consisting of gases, and substituted or unsubstituted aliphatic hydrocarbons (linear, branched or cyclic) and having 3 to 8 carbon atoms.

16. The process according to claim 1, wherein said foamable polymeric material is chosen in the group consisting of thermoplastic or thermosetting polymeric materials.

17. The process according to claim 1, wherein step v of solubilizing under pressure comprises: introducing, under pressure, the foaming agent in the mold containing the foamable polymeric material, such that the foaming agent saturates said foamable polymeric material, so that, when the pressure of the foaming agent is released, said foamable polymeric material is foamed.

18. A product made of a foamed polymeric material manufactured according to the process of claim 1, wherein said product made of foamed polymeric material is, or is part of, a vehicle, a boat, an aircraft, a building structure, a garment or a clothing accessory, a medical device, a device of individual or collective protection, a piece of furniture, or a sports equipment piece.

* * * * *